April 24, 1962   J. O. MELTON ET AL   3,031,202
STEERING MECHANISM IDLER ARM ASSEMBLY
Filed Sept. 24, 1959   2 Sheets-Sheet 1

INVENTORS
JAMES O. MELTON &
THOMAS B. WILKINSON
BY
ATTORNEY

April 24, 1962  J. O. MELTON ET AL  3,031,202
STEERING MECHANISM IDLER ARM ASSEMBLY
Filed Sept. 24, 1959  2 Sheets-Sheet 2

INVENTORS
JAMES O. MELTON &
BY THOMAS B. WILKINSON

ATTORNEY

United States Patent Office 3,031,202
Patented Apr. 24, 1962

3,031,202
STEERING MECHANISM IDLER ARM ASSEMBLY
James O. Melton, Norman, and Thomas B. Wilkinson, Oklahoma City, Okla., assignors to Jamco, Inc., Oklahoma City, Okla., a corporation of Oklahoma
Filed Sept. 24, 1959, Ser. No. 842,017
5 Claims. (Cl. 280—95)

This invention relates to pivotal bearings, and more particularly, to pivotal idler arm assemblies as used in vehicular steering gear mechanisms.

The steering wheel of most automobiles is attached to a shaft in the steering column which, in turn, is attached to a worm gear. As the steering wheel is turned, the worm gear actuates a lever, transmitting the turning motion to control the front wheels of the automobile. A connecting link, or, as it is sometimes termed, a "drag link," transmits the motion from the left to the right front wheel of the automobile.

The drag link is supported at one end by the lever associated with the steering wheel mechanism. In earlier periods of automobile manufacturing, it was a policy to permit the right end of the drag link to remain unsupported. However, it has been learned that improved steering results by pivotally supporting both ends of the drag link. Thus, an idler arm is normally provided for supporting the right end of the drag link to the automobile chassis.

An idler arm is usually pivotally connected at one end thereof to the drag link and is pivotally supported at its opposite end by a bracket attached to the automobile chassis. When the pivotal connection of the idler arm to the bracket becomes worn, the steering mechanism becomes loose, providing rattles and reduced safety.

Prior workers in the art have devised various combinations for repairing idler arm assemblies, and particularly the pivotal connection of an idler arm to an idler arm bracket. However, these prior combinations have almost invariably used ball bearing units to minimize friction while allowing a relatively tight fit to reduce looseness and play. Such bearings are efficient, but are expensive and are difficult to protect from water, mud, etc., such that the service life of such a bearing exposed underneath an automobile is not as long as is desired.

It is an object of this invention to provide an idler arm mechanism which will have reduced slack and play.

Another object of this invention is to provide an idler arm mechanism which will hold accurate tow-in settings by eliminating wear and looseness.

Another object of this invention is to provide an idler arm assembly which will facilitate easier steering of the automobile.

A further object of this invention is to provide a pivotal assembly for an idler arm and bracket which will not be affected by water, mud, etc., to any appreciable extent.

Another object of this invention is to provide an idler arm assembly which will minimize idler arm wear.

Another object of this invention is to provide an idler arm assembly which will be relatively more permanent and lasting than presently existing mechanisms.

Another object of this invention is to provide an idler arm assembly which will be simpler and less expensive to manufacture, and which can be quickly and easily installed.

These another objects and a better understanding of this invention may be had by referring to the following description and claims taken in conjunction with the drawings, of which:

Figure 1:
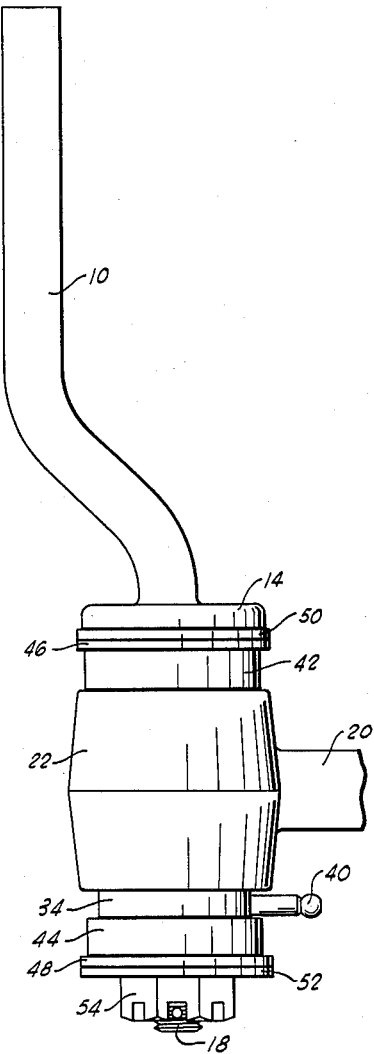
FIGURE 1 is a side elevation of the supporting bracket, idler arm, and bearing assembly constructed in accordance with this invention.

Referring now to the drawings, the numeral 10 designates the bracket which is supported to the automobile chassis by the use of bolt holes 12. Bracket 10 has an integrally formed peripheral flange 14 and a smooth-surfaced spindle portion 16. The spindle portion 16 terminates in a threaded portion 18.

Figure 2:
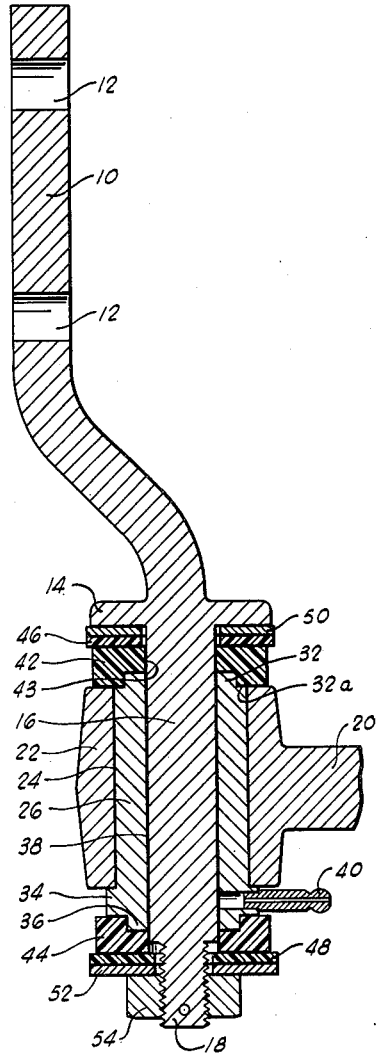
FIGURE 2 is a vertical cross sectional view of the structure shown in FIGURE 1.

The idler arm 20 has a hub portion 22 on one end thereof provided with a bore 24 to receive the spindle 16, while the opposite end (not shown) of the idler arm 20 is adapted for connection with the drag link. As will be observed in FIG. 2, the bore 24 is substantially larger in diameter than the spindle 16, and the problem involved is the journaling of the idler arm on the spindle without looseness or play, and yet with a minimum of friction.

Figure 3:
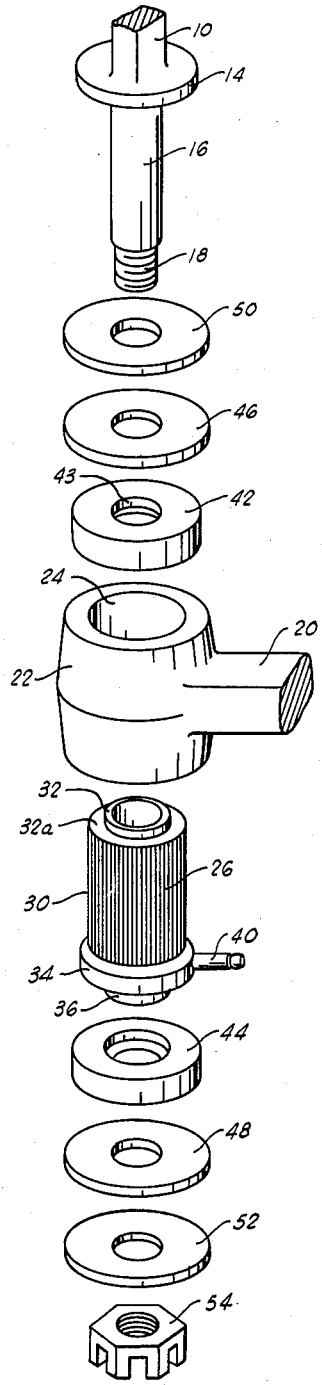
FIGURE 3 is an exploded view showing the several elements detached from each other and in the relationship as shown in FIGURE 1 and FIGURE 2.

In accordance with this invention, an insert sleeve 26 is provided having an outer diameter approximating the diameter of the bore 24, with a splined outer surface 30 to engage the walls of the bore 24 and assure non-rotative retention when the sleeve is inserted in the bore 24. The splined surface 30 is illustrated in FIG. 3. Insert sleeve 26 has a reduced diameter shank 32 at the upper end thereof, and an enlarged diameter circumferential flange 34 near its lower end. The extreme lower end of the sleeve 26 is also provided with a reduced diameter shank 36 similar to the shank 32. The bore 38 through the sleeve 26 has a diameter of a size to provide a sliding fit of the spindle 16 therein. It should also be noted that a grease fitting 40 is secured in the flange 34 of the sleeve 26 for supplying grease to the bore 38 and lubricating the spindle 16.

An upper cup-shaped bearing member 42 having a bore 43 therethrough is loosely supported on the spindle 10 around the upper shank 32 of the sleeve 26 and is preferably of a size to rest on the top of the hub 22, as well as on the upwardly facing shoulder 32a of the sleeve 26 provided by the shank 32. A lower cup-shaped bearing member 44 is also provided at the lower end of the sleeve 26 and is of a size to engage the lower shank 36 and the flange 34. In a preferred embodiment, the bearing members 42 and 44 are the same size to provide interchangeability.

An upper bearing washer 46 is positioned on the spindle 16 above the upper bearing sleeve 42. A lower bearing washer 48 is also positioned on the spindle 16 below the lower bearing sleeve 44. Upper bearing washer 46 and lower bearing washer 48 are of substantially identical construction so as to be interchangeable.

Upper and lower bearing members 42 and 44, and upper and lower bearing washers 46 and 48 are preferably composed of high density synthetic resin materials. Some of the plastic materials which have proven satisfactory include: polymerized olefins, such as sold under the trade name "Marlex"; polymerized tetrafluoroethylene, such as sold under the trade name "Teflon"; and long chain synthetic amides, such as sold under the trade name "Nylon." In practice it has been found that particularly good results and an economical construction are obtained when the bearing members 42 and 44 are composed of a polymerized olefin characterized by the fact that their unsaturation is preponderantly of the trans-internal or terminal vinyl type, as polymerized according to methods described in U.S. Patent 2,825,721, while bearing washers 46 and 48 are composed of a long chain polymeric amide plastic. This is due to the fact that superior results obtain when two contacting bearing surfaces are employed which are of dissimilar molecular structure, as further explained below, and also to the superior anti-frictional properties of the polymerized ethylene plastic which make it attractive for utilization as one of the two dissimilar plastic materials utilized.

An upper metal retaining washer 50 and a lower metal retaining washer 52 of interchangeable construction, are also positioned on the spindle 16. Upper retainer washer 50 is positioned between upper bearing washer 46 and peripheral bracket flange 14. Lower retainer washer 52 is positioned below the lower bearing washer 48. A nut 54 engages the threaded portion 18 of bracket 10 to support lower retainer washer 52 against lower bearing washer 48 and to secure the complete bearing assembly in a sealed relationship during operation, with the hub 22 in a fixed longitudinal position on the spindle 16.

One of the novel features of this invention involves the inherent lubricative characteristic existing between certain synthetic resins, especially dissimilar resins. The superiority of the bearing formed by utilizing dissimilar plastics, instead of identical plastics, is due to the tendency of the abutting surfaces of two bearing members formed of an identical plastic to adhere to each other. This tendency to adhere is in turn believed to be due to the chemical affinity of the identical molecules in the two opposed surfaces which causes them to condense or polymerize with each other under the influence of the pressure and heat which exist during the conditions of operation. On the other hand, if the two bearing surfaces are formed of plastics having molecules which differ in structure or chain length, such affinity is reduced or eliminated. As idler arm 20 pivots, a bearing relationship exists between upper bearing member 42 and washer 46, as well as between lower bearing member 44 and washer 48. Due to the lubricous character of the contact area existing between these synthetic resin components, ample pressure can be exerted by tightening the nut 54 on the threaded portion 18 of spindle 16 to insure a bearing assembly free of play or slack, yet at the same time maintaining a minimum of frictional resistance to the pivotation of the idler arm 20. Bearing washers 46 and 48, along with bearing members 42 and 44, serve to seal the spindle 16 in the sleeve 26 against the loss of grease, as well as the entrance of water, mud or dust, as would be naturally encountered in the exposed use of automobiles. It should also be noted that the bearing elements 42, 44, 46 and 48 do not require lubrication.

Another novel feature of the present bearing construction is the minimizing of the possibility of overloading the bearing surfaces when the device is assembled. Since the bearing elements 42, 44, 46 and 48 are slightly plastic, they will deform in the event the nut 54 is tightened to an excessive degree and relieve the force applied against the bearing surfaces, such that the minimum friction will be provided. Furthermore, the bearing elements 42, 44, 46 and 48 will absorb shocks, such as when an automobile is driven over a rough road, without damage.

This invention has been described as it particularly applies to idler arm mechanisms of automobiles. However, it can be seen that the principles of this invention are readily adaptable to any relatively oscillating members, both for use in automobiles and in other applications.

Although this invention has been described with a certain degree of particularity, it is manifest that many changes may be made in the details of construction and arrangement of the components without departing from the spirit or the scope of this disclosure as set forth in the appended claims.

We claim:
1. In a steering idler arm assembly for pivotally supporting a steering mechanism to an automobile chassis, comprising, in combination, a bracket adapted for attachment to said chassis, said bracket having a peripheral flange and a smooth-surfaced spindle extending downwardly from the flange and terminating in a threaded portion, an insert sleeve having an inner diameter of a size to slidingly receive said spindle, said insert sleeve having an upper shank and a lower shank, said insert sleeve having an integrally formed peripheral flange adjacent said lower shank; an idler arm having a bore therethrough of a size to tightly receive said insert sleeve; an upper bearing member disposed to receive said spindle and mate with said upper shank of said insert sleeve; a lower bearing member disposed to receive said spindle and mate with said lower shank of said insert sleeve; an upper bearing washer disposed to receive said spindle and to contact said upper bearing member; a lower bearing washer disposed to receive said spindle and to contact said lower bearing member; said bearing members and bearing washers being formed out of high density synthetic resin materials, and a nut disposed to engage said spindle threaded portion, whereby said assembly is compressibly retained.

2. An assembly according to claim 1 including an upper retaining washer disposed to receive said spindle and to contact said upper bearing washer and said bracket peripheral flange.

3. An assembly according to claim 1 wherein said upper and lower bearing members are composed of a polymerized olefin material and said upper and lower bearing washers are composed of a polymerized amide material.

4. An idler arm assembly comprising a bracket having a spindle; an idler arm having a bore therethrough for pivotally mounting the idler arm on said spindle; an insert sleeve around said spindle and frictionally retained in said bore for turning movement with said idler arm relative to said spindle; high density, synthetic resin material bearing means on said spindle engaging at least one end of said insert sleeve and a portion of said spindle adjacent said insert sleeve, said bearing means including a high density, synthetic resin bearing washer and a high density, synthetic resin annulus positioned between said bearing washer and said insert sleeve, said annulus having an inside diameter substantially equal to the inside diameter of said insert sleeve, and having an outside diameter greater than the inside diameter of the bore of said idler arm for preventing infiltration of deleterious materials between said idler arm hub and said insert sleeve; and means for loading said bearing means and for retaining said insert sleeve in a fixed longitudinal position on said spindle.

5. An assembly according to claim 4 wherein said bearing washer and bearing member are composed of dissimilar synthetic resin materials.

References Cited in the file of this patent

UNITED STATES PATENTS

| | | |
|---|---|---|
| 2,642,318 | Ricks | June 16, 1953 |
| 2,689,756 | Carlson | Sept. 21, 1954 |
| 2,775,793 | Cotchett | Jan. 1, 1957 |
| 2,809,049 | Carlson | Oct. 8, 1957 |
| 2,816,453 | Frank et al. | Dec. 17, 1957 |
| 2,853,327 | Traugott | Sept. 23, 1958 |
| 2,952,486 | Reuter et al. | Sept. 13, 1960 |